(12) United States Patent
Stanley et al.

(10) Patent No.: US 10,663,579 B2
(45) Date of Patent: May 26, 2020

(54) EXTENDING FOOTPRINT FOR LOCALIZATION USING SURFACE PENETRATING RADAR (SPR)

(71) Applicant: Massachusetts Institute of Technology, Cambridge, MA (US)

(72) Inventors: Byron McCall Stanley, Newton, MA (US); Matthew Tyler Cornick, San Diego, CA (US)

(73) Assignee: MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 256 days.

(21) Appl. No.: 15/882,986

(22) Filed: Jan. 29, 2018

(65) Prior Publication Data

US 2018/0224540 A1   Aug. 9, 2018

Related U.S. Application Data

(60) Provisional application No. 62/529,740, filed on Jul. 7, 2017, provisional application No. 62/451,313, filed on Jan. 27, 2017.

(51) Int. Cl.
*G01S 13/88*   (2006.01)
*G01S 7/41*    (2006.01)
(Continued)

(52) U.S. Cl.
CPC ............ *G01S 13/885* (2013.01); *B60W 40/06* (2013.01); *G01S 7/411* (2013.01); *G01S 13/87* (2013.01);
(Continued)

(58) Field of Classification Search
CPC ........ G01S 13/885; G01S 13/89; G01S 13/34; G01S 13/872; G01S 13/951; G01S 7/411;
(Continued)

(56) References Cited

U.S. PATENT DOCUMENTS 3,366,960 A   1/1968  Gluck
4,162,509 A   7/1979  Robertson
(Continued)

FOREIGN PATENT DOCUMENTS

JP   09053939 A    2/1997
JP   2001289651    10/2001
(Continued)

OTHER PUBLICATIONS

International Search Report & Written Opinion in International Patent Application No. PCT/US17/64458, dated Feb. 5, 2018; 7 pages.
(Continued)

*Primary Examiner* — Olumide Ajibade Akonai
(74) *Attorney, Agent, or Firm* — Schmeiser, Olsen & Watts LLP; V. Raman Bharatula

(57) ABSTRACT

A method for extending a surface penetrating radar (SPR) footprint for performing localization with an SPR system is disclosed. The method may include may include transmitting at least one SPR signal from at least one SPR transmit element. The method may further include receiving a response signal via at least two SPR receive elements, the response signal including, at least in part, a reflection of the SPR signal from an object. The method may also include determining that the object is in a region of interest outside a footprint of the SPR system based on a difference in phase at which the response signal is received at the at least two SPR receive elements. The method may additionally include performing localization of a vehicle using the SPR system based at least in part on the object.

20 Claims, 16 Drawing Sheets

(51) Int. Cl.
| | |
|---|---|
| B60W 40/06 | (2012.01) |
| G01S 13/87 | (2006.01) |
| G01S 13/95 | (2006.01) |
| G01S 13/89 | (2006.01) |
| G01S 13/86 | (2006.01) |
| G01C 21/36 | (2006.01) |
| G01S 13/931 | (2020.01) |
| G01C 21/26 | (2006.01) |

(52) U.S. Cl.
CPC ............ *G01S 13/872* (2013.01); *G01S 13/89* (2013.01); *G01S 13/951* (2013.01); *B60W 2550/14* (2013.01); *G01C 21/26* (2013.01); *G01C 21/3602* (2013.01); *G01S 13/862* (2013.01); *G01S 13/865* (2013.01); *G01S 13/867* (2013.01); *G01S 2013/9327* (2020.01)

(58) Field of Classification Search
CPC ........ G01S 13/88; G01S 13/931; G01S 7/292; G01S 2013/9375; G01S 2013/9378; G01S 7/41; G01S 13/02; G01S 13/87; G01S 7/4021; G01S 7/352; G01S 19/07; G01S 7/354; B60W 2550/14; B60W 40/06; B60W 2420/52; G01V 3/12; H04B 1/06
See application file for complete search history.

(56) References Cited

U.S. PATENT DOCUMENTS

| | | | |
|---|---|---|---|
| 4,495,589 A | 1/1985 | Hirzel | |
| 4,671,650 A | 6/1987 | Hirzel et al. | |
| 5,202,692 A | 4/1993 | Huguenin et al. | |
| 5,485,384 A | 1/1996 | Falconnet | |
| 6,005,511 A | 12/1999 | Young et al. | |
| 6,082,466 A | 7/2000 | Gudat | |
| 6,362,775 B1 | 3/2002 | Goebel et al. | |
| 6,370,475 B1 | 4/2002 | Breed et al. | |
| 6,453,223 B1 | 9/2002 | Kelly et al. | |
| 6,766,253 B2 | 7/2004 | Burns et al. | |
| 7,191,056 B2 | 3/2007 | Costello et al. | |
| 7,395,156 B2 | 7/2008 | Chiou et al. | |
| 8,207,834 B2 | 6/2012 | Takemura et al. | |
| 8,207,885 B2 * | 6/2012 | Hibbard | G01S 13/106 342/137 |
| 8,306,747 B1 | 11/2012 | Gagarin et al. | |
| 8,457,814 B2 | 6/2013 | Hasegawa | |
| 8,730,084 B2 | 5/2014 | Al-Khalefah et al. | |
| 8,786,485 B2 | 7/2014 | Atkins et al. | |
| 8,849,523 B1 | 9/2014 | Chan et al. | |
| 8,949,024 B2 * | 2/2015 | Stanley | G05D 1/0257 340/988 |
| 8,994,581 B1 | 3/2015 | Brown | |
| 2002/0122000 A1 | 9/2002 | Bradley et al. | |
| 2003/0090406 A1 | 5/2003 | Longstaff et al. | |
| 2004/0032363 A1 | 2/2004 | Schantz et al. | |
| 2006/0044177 A1 * | 3/2006 | Wittenberg | G01S 13/426 342/25 A |
| 2006/0095172 A1 | 5/2006 | Abramovitch et al. | |
| 2008/0143585 A1 * | 6/2008 | Thomas | G01S 7/4021 342/174 |
| 2009/0051593 A1 * | 2/2009 | Wiesbeck | G01S 7/2813 342/372 |
| 2010/0002655 A1 | 2/2010 | Whittaker et al. | |
| 2010/0052971 A1 * | 3/2010 | Amarillas | G01S 13/885 342/22 |
| 2010/0066585 A1 | 3/2010 | Hibbard et al. | |
| 2010/0085175 A1 | 4/2010 | Fridthjof | |
| 2010/0189498 A1 | 7/2010 | Doherty et al. | |
| 2010/0259438 A1 | 10/2010 | Jones et al. | |
| 2011/0025546 A1 | 2/2011 | Cook et al. | |
| 2012/0026329 A1 | 2/2012 | Vorobiev | |
| 2012/0271540 A1 | 10/2012 | Miksa et al. | |
| 2013/0018575 A1 | 1/2013 | Birken et al. | |
| 2013/0050008 A1 | 2/2013 | Atkins et al. | |
| 2013/0113648 A1 | 5/2013 | Duvoisin, III et al. | |
| 2014/0022117 A1 | 1/2014 | Cist | |
| 2014/0081507 A1 | 3/2014 | Urmson et al. | |
| 2014/0121964 A1 | 5/2014 | Stanley | |
| 2014/0125509 A1 | 5/2014 | Stolarczyk et al. | |
| 2014/0159938 A1 | 6/2014 | Shipley et al. | |
| 2015/0268218 A1 | 9/2015 | Troxler | |
| 2016/0097879 A1 | 4/2016 | Stolarczyk et al. | |
| 2017/0184717 A1 | 6/2017 | Feigin | |
| 2018/0114305 A1 * | 4/2018 | Strnad | A01B 79/005 |

FOREIGN PATENT DOCUMENTS

| | | | |
|---|---|---|---|
| JP | 2001289651 A | 10/2001 | |
| KR | 20060087449 A | 8/2006 | |
| WO | WO-2005098471 A2 * | 10/2005 | ........... G01S 13/584 |
| WO | 2012167069 A1 | 12/2012 | |

OTHER PUBLICATIONS

California Partners for Advanced Transit and Highways, "California PATH Magnetic Guidance System", University of California, Berkeley, Institute of Transportation Studies, Richmond, CA; 2 pages.

Levinson, Jesse and Sebastian Thrun, "Robust Vehicle Localization in Urban Environments Using Probabilistic Maps", 2010 IEEE International Conference on Robotics and Automation, May 3-8, 2010, Anchorage, Alaska; 7 pages.

Hahnel, et al., "An Efficient FastSLAM Algorithm for Generating Maps of Large-Scale Cyclic Environments from Raw Laser Range Measurements", 2003 IEEE/RSJ International Conference on Intelligent Robots and Systems, Proceedings, pp. 206-211, vol. 1; 6 pages.

International Search Report & Written Opinion in international application No. PCT/US13130682, mailed on Dec. 16, 2013; 11 pp.

Non-Final Office Action in U.S. Appl. No. 13/798,416, dated May 28, 2014; 14 pages.

Non-Final Office Action in U.S. Appl. No. 13/798,416, dated Sep. 17, 2014; 9 pages.

Notice of Allowance in U.S. Appl. No. 13/798,416, dated Nov. 17, 2014; 5 pages.

Ryan, Dorothy, "Lincoln Laboratory Demonstrates Highly Accurate Vehicle Localization Under Adverse Weather Conditions", www.ll.mit.edu/news/Highly-accurate-vehicle-localization-under-adverse-weather.html, 3 pages, Jun. 2016.

Fenn, et al., Ultrawideband Cavity-Backed Resistively Loaded Planar Dipole Array for Ground Penetrating Radar, IEEE International Symposium on Phased Array, Waltham, MA, pp. 117-123, 2013.

Cornick, et al., "Localizing Ground Penetrating RADAR: A Step Toward Robust Autonomous Ground Vehicle Localization", 2015, Journal of Field Robotics, vol. 33, pp. 82-102, 2016.

International Search Report & Written Opinion in international application No. PCT/US18/15791, dated May 10, 2018; 9 pages.

International Search Report & Written Opinion for international application No. PCT/US18/15775, dated Apr. 13, 2018.

Website for "Enabling Autonomous Vehicles to Drive in the Snow with Localizing Ground Penetrating Radar." MIT Lincoln Laboratory. Jun. 24, 2016. https://www.youtube.com/watch?v=rZq5FMwl8D4.

Stanley, Bryon M. "Localizing Ground-Penetrating Radar." MIT Lincoln Laboratory. Jun. 13, 2017, 30 pages.

"Commercial Vehicle On-Board Safety Systems Rountable" International Transport Forum, Jan. 5-6, 2017. http://www.itf-oecd.org/managing-transition-driverless-road-freight-transport.

"Managing the Transition to Driverless Road Freight Transport." International Transport Forum, May 31, 2017. https://www.itf-oecd.org/managing-transition-driverless-road-freight-transport.

Stanley, Bryon M. "Localizing Ground-Penetrating Radar Deep Dive." MIT Lincoln Laboratory. Jul. 12, 2017, 44 pages.

"Data-Led Governance of Road Freight Transport." International Transport Forum, May 31, 2017. https://www.itf-oecd.org/data-led-governance-road-freight-transport.

(56) References Cited

OTHER PUBLICATIONS

International Preliminary Report on Patentability in PCT/US2018/015791 dated Aug. 8, 2019; 8 pages.
International Preliminary Report on Patentability in PCT/US2018/015775 dated Aug. 8, 2019; 8 pages.
International Preliminary Report on Patentability in PCT/US2017/064458 dated Oct. 31, 2019; 6 pages.
Non-Final Office Action in U.S. Appl. No. 15/830,398 dated Oct. 28, 2019; 16 pages.
International Search Report & Written Opinion in international application No. PCT/US13/30682, dated Dec. 16, 2013; 11 pages.
Cornick, et al., "Localizing Ground Penetrating RADAR: A Step Toward Robust Autonomous Ground Vehicle Localization", Journal of Field Robotics, vol. 33, pp. 82-102, 2016.
Busuioc et al. "Novel, Low-Cost Millimeter-wave System for Road Surface Characterization," Proceedings of SPIE vol. 7983, 2011.
Non-Final Office Action in U.S. Appl. No. 15/882,889 dated Nov. 18, 2019; 14 pages.
Notice of Allowance in U.S. Appl. No. 15/830,398 dated Mar. 25, 2020; 9 pages.

* cited by examiner

EXTENDING FOOTPRINT FOR LOCALIZATION USING SURFACE PENETRATING RADAR (SPR)

RELATED APPLICATIONS

This application claims the benefit of the earlier filing date of U.S. Provisional Patent Application No. 62/451,313, filed Jan. 27, 2017 and titled "LGPR Capability," and U.S. Provisional Patent Application No. 62/529,740, filed Jul. 7, 2017 and titled "Localizing Ground-Penetrating Radar," the entireties of which are incorporated herein by reference.

GOVERNMENT RIGHTS IN THE INVENTION

This invention was made with government support under Contract No. FA8721-05-C-0002 awarded by the U.S. Air Force. The government has certain rights in the invention.

FIELD OF THE INVENTION

The present invention relates generally to a method and a system for determining surface characteristics. The method and system may be used for controlling a vehicle.

BACKGROUND OF THE INVENTION

Autonomous navigation of vehicles may require extensive mapping and mapping data to be acquired and stored. The acquiring and storing of the mapping data may require many resources and may be expensive and time-consuming. Further, using the mapping data for autonomous vehicle navigation may require accurate and precise transceiving and/or sensing equipment which may have limitations both in imaging granularity and range. Thus, there may be a need for methods and systems to make more efficient use of the transceiving and/or sensing equipment used in autonomous vehicle navigation.

SUMMARY

Example embodiments of the present technology include a method determining surface characteristics.

In an embodiment, a method for extending a surface penetrating radar (SPR) footprint for performing localization with an SPR system may include transmitting at least one SPR signal from at least one SPR transmit element. The method may further include receiving a response signal via at least two SPR receive elements, the response signal including, at least in part, a reflection of the SPR signal from an object. The method may also include determining that the object is in a region of interest outside a footprint of the SPR system based on a difference in phase at which the response signal is received at the at least two SPR receive elements. The method may additionally include performing localization of a vehicle using the SPR system based at least in part on the object.

In various implementations, the method may include expanding a map associated with performing localization with the SPR system based at least in part on the object. The method may further include performing localization of the vehicle when a tracking pass only partially overlaps with a map footprint associated with performing localization with the SPR system. The object may not be below an SPR antenna array of the SPR system. The method may also include expanding a map associated with performing localization with the SPR system beyond an area below the SPR antenna array. The method may additionally include performing less mapping passes of an area by expanding the map associated with performing localization with the SPR system. Furthermore, the method may include expanding an area where localization can be performed by expanding the map associated with performing localization with the SPR system. Moreover, the method may include determining a distance from the object to an SPR element of the SPR system based on the receiving of the response signal via the at least two SPR receive elements. Also, the method may include migrating data associated with the receiving of the response signal via the at least two SPR receive elements.

In an embodiment, a method for extending a surface penetrating radar (SPR) footprint for performing localization with an SPR system may include transmitting two or more SPR signals each from a different SPR transmit element. The method may further include receiving two or more response signals via a SPR receive element, the response signals including, at least in part, reflections of the two or more SPR signals from an object. The method may also include determining that the object is in a region of interest outside a footprint of the SPR system based on a difference in phase at which the two or more response signals are received at the SPR receive element. The method may additionally include performing localization of a vehicle using the SPR system based at least in part on the object.

In various implementations, the method may include expanding a map associated with performing localization with the SPR system based at least in part on the object. The method may also include performing localization of the vehicle when a tracking pass only partially overlaps with a map footprint associated with performing localization with the SPR system. The object may not be below an SPR antenna array of the SPR system. The method may further include expanding a map associated with performing localization with the SPR system beyond an area below the corresponding SPR antenna array. The method may additionally include performing less mapping passes of an area by expanding the map associated with performing localization with the SPR system. Moreover, the method may include expanding an area where localization can be performed by expanding the map associated with performing localization with the SPR system. Furthermore, the method may include determining a distance from the object to an SPR element of the SPR system based on the receiving of the two or more response signals via the SPR receive element. Also, the method may include migrating data associated with the receiving of the response signal via the SPR receive element.

In an embodiment, a method for extending a surface penetrating radar (SPR) footprint for performing localization with an SPR system may include transmitting a first SPR signal from a first SPR transmit element and a second SPR signal from a second SPR transmit element. The method may further include receiving a first response signal at a first SPR receive element and at a second SPR receive element, the first response signal including, at least in part, a reflection of the first SPR signal from an object. The method may also include receiving a second response signal via at least one of the first SPR receive element and the second SPR receive element, the second response signal including, at least in part, a reflection of the second SPR signal from the object. The method may additionally include determining that the object is in a region of interest outside a footprint of the SPR system based on a difference in phase at which the first response signal is received at the first SPR receive element and the second SPR receive element and a difference in phase at which the first response signal and the second response signal are received via the at least one of the first SPR receive element and the second SPR receive element.

Moreover, the method may include performing localization of a vehicle using the SPR system based at least in part on the object.

In an embodiment, a system for extending a surface penetrating radar (SPR) footprint for performing localization with SPR may include a first SPR transmit element configured to transmit a first SPR signal. The system may also include a second SPR transmit element configured to transmit a second SPR signal. The system may further include a first SPR receive element configured to receive a first response signal, the first response signal including, at least in part, a reflection of the first SPR signal from an object. The system may additionally include a second SPR receive element configured to receive the first response signal, wherein at least one of the first and second SPR receive elements are configured to receive a second response signal, the second response signal including, at least in part, a reflection of the second SPR signal from the object. Moreover the system may include one or more processors in communication with the first and second SPR receive elements. The one or more processors may be configured to determine that the object is in a region of interest outside a footprint associated with the system based on a difference in phase at which the first response signal is received at the first SPR receive element and the second SPR receive element and a difference in phase at which the first response signal and the second response signal are received via the at least one of the first SPR receive element and the second SPR receive element. The one or more processors may be further configured to perform localization of a vehicle based at least in part on the object.

BRIEF DESCRIPTION OF THE DRAWINGS

The above and further advantages of this invention may be better understood by referring to the following description in conjunction with the accompanying drawings, in which like numerals indicate like structural elements and features in the various figures. For clarity, not every element may be labeled in every figure. The drawings are not necessarily to scale, emphasis instead being placed upon illustrating the principles of the invention.

DETAILED DESCRIPTION

Figure 1A:
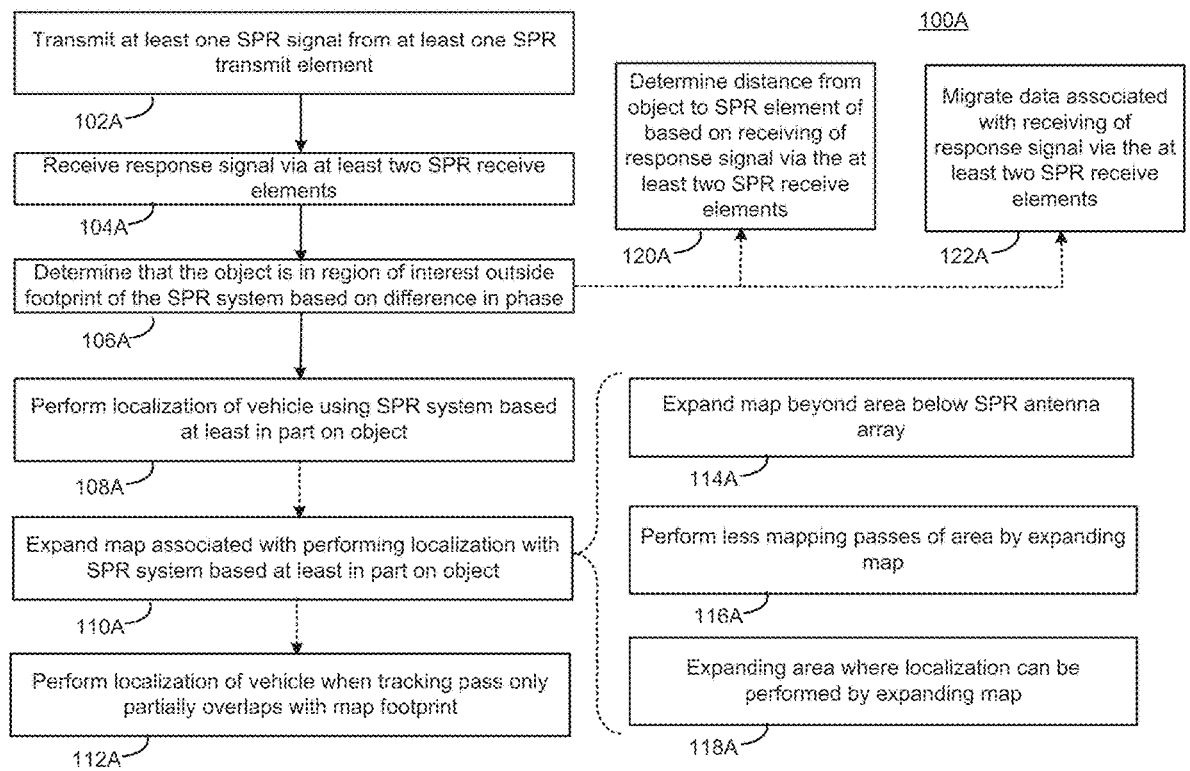
FIGS. 1A, 1B, and 1C are flowchart representations of embodiments of methods for extending a surface penetrating radar (SPR) footprint for performing localization with an SPR system.

Reference is made in various embodiments described below to ground and a surface of the ground. It will be understood that the ground includes soil, road surface or pavement such as asphalt and concrete layers, gravel, sand and the like, and that the surface of the ground is the interface of the ground with the air, array, fluid, snow, rain, sludge, mud, or free space. In some instances, the surface may also include the surfaces that surround a tunnel, mineshaft and other passageways through which a vehicle may travel.

More generally, reference is made herein to surface penetrating radar (SPR) and ground penetrating radar (GPR). As used herein, SPR means any radar system that is configured to acquired data from a subsurface region. A SPR can be configured and oriented to obtain data for a subsurface region that is behind the surface of a wall, ceiling, floor or one or more surfaces along a tunnel or passageway. In some instances, the SPR can also obtain data for the surface. It will be recognized that a GPR system is a type of SPR system which is configured to acquire data from a region below the surface of the ground and may also acquire data for the surface of the ground. A subsurface region, as used herein, means a region behind the surface such as an underground region behind the ground surface. Alternatively, the subsurface region can be a region behind a surface of a structure, such as a region inside and/or behind a wall or ceiling structure.

In brief overview, the present disclosure relates to methods and systems for extending a SPR footprint for performing localization with an SPR system. A method may include transmitting at least one SPR signal from at least one SPR transmit element. The method may further include receiving a response signal via at least two SPR receive elements, the response signal including, at least in part, a reflection of the SPR signal from an object. The method may also include determining that the object is in a region of interest outside a footprint of the SPR system based on a difference in phase at which the response signal is received at the at least two SPR receive elements. The method may additionally include performing localization of a vehicle using the SPR system based at least in part on the object.

Methods and systems for localization of a vehicle using SPR or GPR are described, for example, in U.S. patent application Ser. No. 15/830,398, titled "Method and System for Localization of a Vehicle Using Surface Penetrating Radar" and in U.S. Pat. No. 8,949,024, titled "Vehicle Localization Using Surface Penetrating Radar," the disclosures of which are both incorporated herein by reference in their entirety.

Previously acquired SPR images can be used as a subsurface map to aid in vehicle navigation. Maps can be created with different accuracies and subsurface depths.

Lower accuracy maps are used for coarse localization tracking during a vehicle pass over the mapped subsurface region. For example, a lower accuracy map can be used with the first set of SPR images to obtain lower accuracy location data and higher accuracy maps can then be used in conjunction with the coarse location data to obtain fine location data from the second set of SPR images. The coarse localization aids in reducing the search volume for the fine localization and in increasing the robustness and accuracy of the final determined location data. In addition, the use of multiple registration matches obtained for each vehicle position based on the multiple maps further aids in improving robustness and accuracy. In some situations, a subset of significant feature sets within a map can be extracted to allow rapid global localization of the vehicle as a coarse localization using the techniques described in U.S. Pat. No. 8,949,024. The reduced processing set is used to rapidly "relocate" the vehicle in a global reference. This technique is beneficial in GPS-denied environments, such as when the vehicle loses track and has no accurate global estimate of position.

Previously acquired SPR reference images can be combined, or stitched, to provide more reference image data than that which can be acquired for a single pass of a mobile SPR system. For example, GPR reference image data for a multi-lane highway can be acquired by multiple passes of a mobile GPR system with each pass corresponding to a single lane of the highway. The GPR reference images for the lanes can be seamlessly combined to provide image data for the full width of the highway. Thus, a vehicle's navigation system can use the reference images for traveling in any lane and for transitioning between adjacent lanes. Alternatively, only a portion of the width of the highway (e.g., a central lane) may be represented in the stored GPR reference images as long as sufficient overlap exists between the subsurface region of a vehicle and the subsurface region represented in the stored GPR reference images for the highway. The trip path for the vehicle can be defined by a global path without particular reference to the path of the reference vehicles used to obtain the SPR reference images. Alternatively, it may be possible to define a trip path using a lane adjacent to the central lane by maintaining a desired lateral offset between the actual vehicle track and a path associated with the GPR reference images. Any further data collected by vehicles (even while tracking a path) may be used to update the reference image data.

In some embodiments the SPR images also include surface data, i.e., data for the interface of the subsurface region with air or the local environment. If the SPR antenna array is not in contact with the surface, the strongest return signal received is typically based on the reflection caused by the surface.

Although the methods and systems described herein are discussed in the context of facilitating autonomous ground vehicle navigation, the methods and systems may be useful for other types of navigation. The facilitation of autonomous vehicle navigation is not limited to automobiles and other forms of surface vehicles traveling on land. Instead the techniques and features for facilitation of autonomous vehicle navigation described in the present disclosure may be applied to navigation on water, underwater, underground, indoors, or by flight.

Figure 1B:
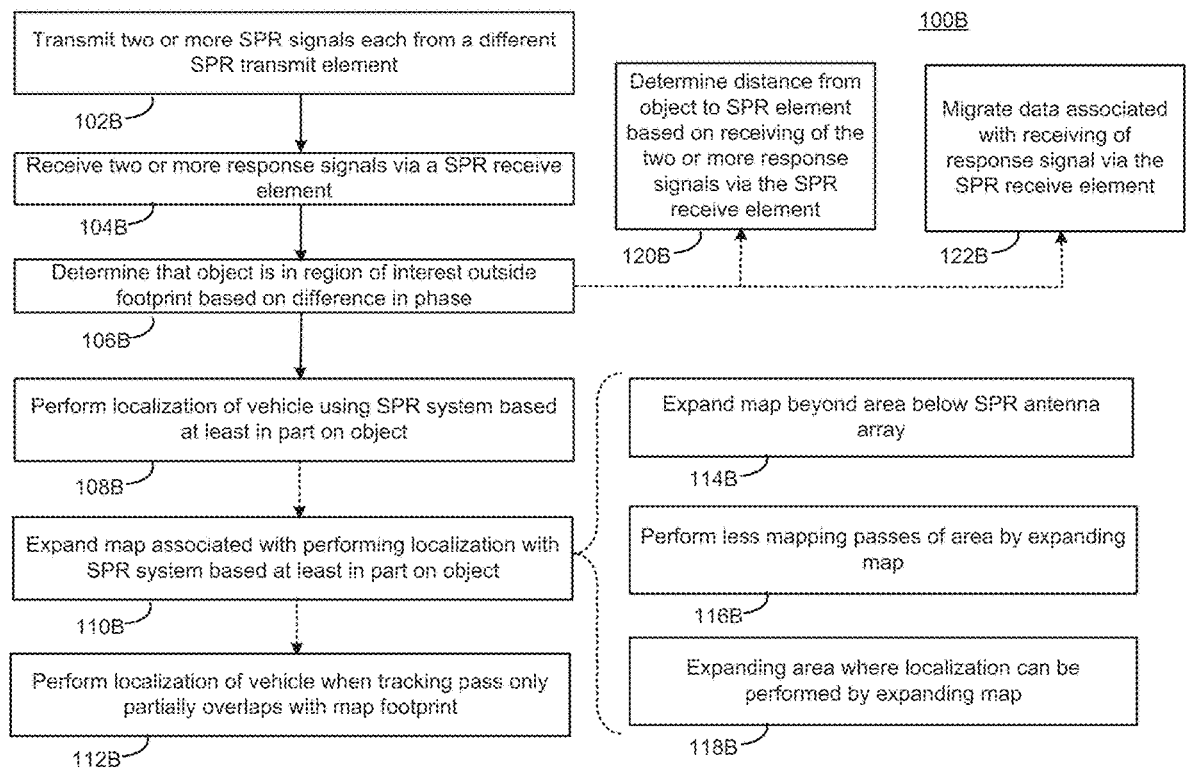
Figure 1C:
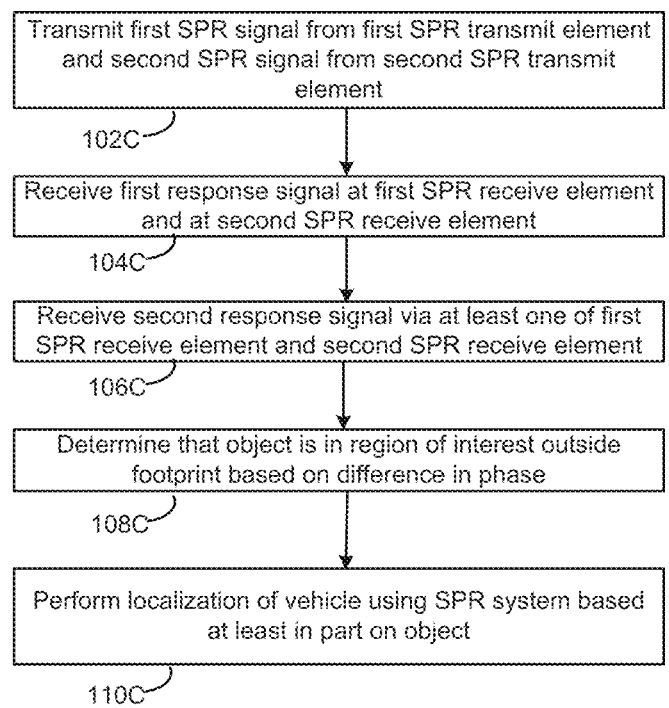
Figure 2:
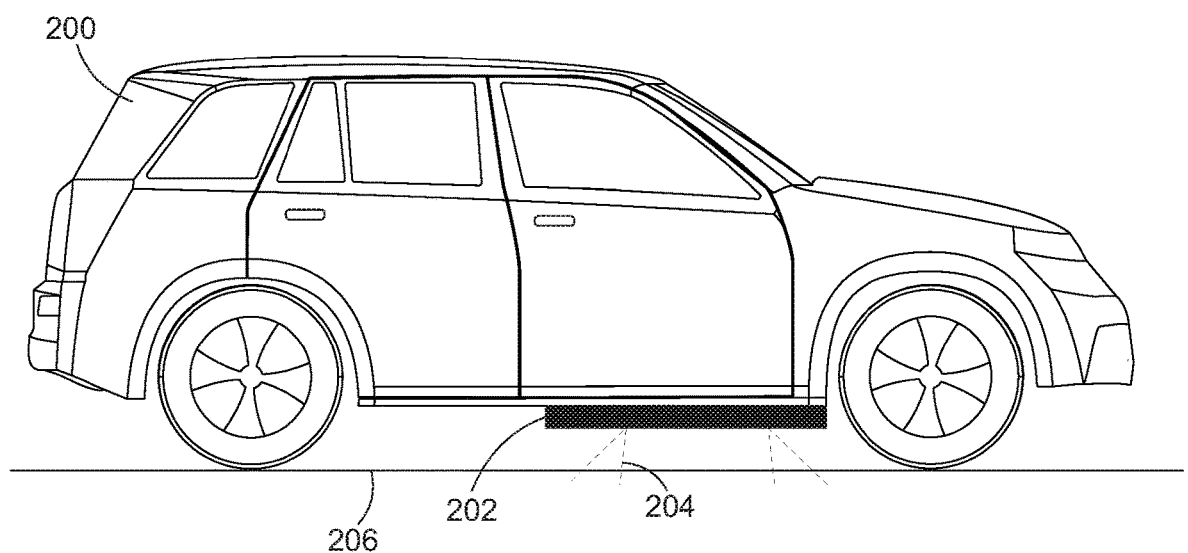
FIG. 2 shows a side view of a vehicle equipped with a GPR system in accordance with the present disclosure.

Referring to FIGS. 1A, 1B, and 1C flowcharts of methods 100A, 100B, and 100C for extending a SPR footprint for performing localization with an SPR system in accordance with the present disclosure are shown. Referring also to FIG. 2, a side view of a vehicle 200 equipped with a SPR system 202 in accordance with the present disclosure is shown. It should be noted that SPR system 202 and other SPR systems described in the present disclosure may be designed for performing ground or surface penetrating radar operations and collecting data for subsurface imaging.

Although depicted as an automobile, the vehicle 200 may be any mobile platform or structure, including by way of non-limiting examples, platforms for transporting passengers or payloads such as equipment, sensors and other objects. The vehicle 200 may have the capability to change direction (i.e., steer), accelerate and decelerate. Although the vehicle 200 in the illustration is generally understood to be non-holonomic as its controllable degrees of freedom are less than the total degrees of freedom, a holonomic vehicle, such as a vehicle with omnidirectional wheels, is also contemplated. In other embodiments, the vehicle 200 may be capable of changing one or more of its altitude (or distance from the surface of the ground), pitch, yaw and roll. The vehicle 200 may include a SPR-based navigation system and may be operated in an autonomous mode. In other words, passenger operation of the vehicle 200 may be limited or absent, and there may be no remote commands received by the vehicle 200 for navigation. By way of an example, limited operation may include control of the speed by a passenger while other operations remain under autonomous control.

Referring to FIG. 1A, in an embodiment, method 100A may include transmitting 102A at least one SPR signal (e.g., SPR signal 204) from at least one SPR transmit element. SPR system 202 may include an antenna array fixed to the underside of vehicle 202. The SPR antenna array may include a linear configuration of spatially-invariant transmit and receive antenna elements for transmitting and receiving radar signals. Signal 204 may be transmitted by one of the transmit antenna elements of the SPR antenna array. In other embodiments, the SPR antenna array may be located elsewhere on the vehicle 202 (e.g., fixed to the front of the vehicle) and the transmit and receive antenna elements may not be linearly arranged. The SPR antenna array may be nominally or substantially parallel to the ground surface 206 and may extend parallel or perpendicular to the direction of travel. SPR signals (e.g., signal 204) may propagate downward from the transmitting antenna elements to and/or through the road surface 206 under the vehicle 202. The SPR signals may be backscattered in an upward direction from the surface 206 of below the surface 206 and may be detected by the receiving antenna elements.

In various implementations, the SPR signal may comprise frequencies or ranges of frequencies which may be selected based on sensitivity to surface subsurface characteristics. Frequency responses may be analyzed to determine suitable frequencies for the SPR signal. For example, frequency selection may be based on the response for each frequency as it relates to reflection from various surface or subsurface characteristics. Frequencies may be selected such that particular depth ranges or feature types, stabilities, clutter levels and features sizes are emphasized or deemphasized in the data. Thus, frequency selection may allow emphasis of certain surface characteristics.

Figure 5:
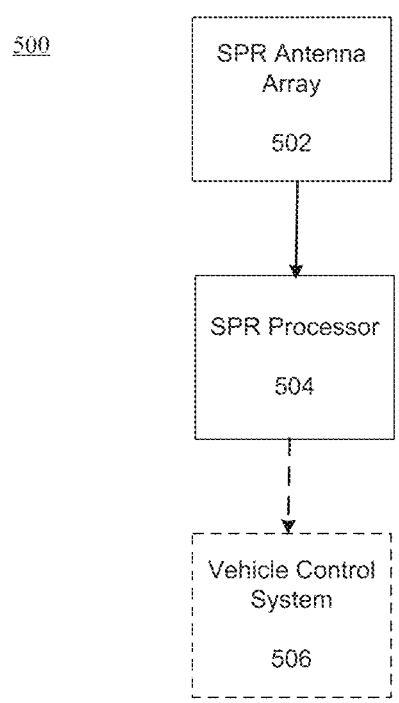
FIG. 5 shows an example GPR system in accordance with the present disclosure.

Referring now to FIG. 5, an example SPR system in accordance with the present disclosure is shown. SPR system 500 may be a mobile SPR system and may include SPR antenna array 502. For example, SPR antenna array 502 may be fixed to the underside of vehicle. SPR antenna array 502 may include one or more transmit and receive antenna elements for transmitting and receiving radar signals. Further, SPR antenna array 502 may be in communication with SPR processor 504 which may control SPR antenna array 502. For example, SPR processor 504 may control the transmit operations of SPR antenna array 502 or one or more of the transmit and receive antenna elements therein. SPR processor 504 may receive return radar signals from SPR antenna array 502 or one or more of the antenna elements therein. SPR system 202 of FIG. 2 may be the same as, similar to, or an implementation of SPR system 500.

In in implementation, SPR system 500 may also include one or more components for performing localization operations of the vehicle. For example, SPR system 500 may include a registration module, conversion module, user interface, and/or reference image source, as discussed in more detail in U.S. patent application Ser. No. 15/830,398, mentioned above. In this way, the SPR system may also be used in a localization application for the vehicle (e.g., vehicle 200).

Figure 3:
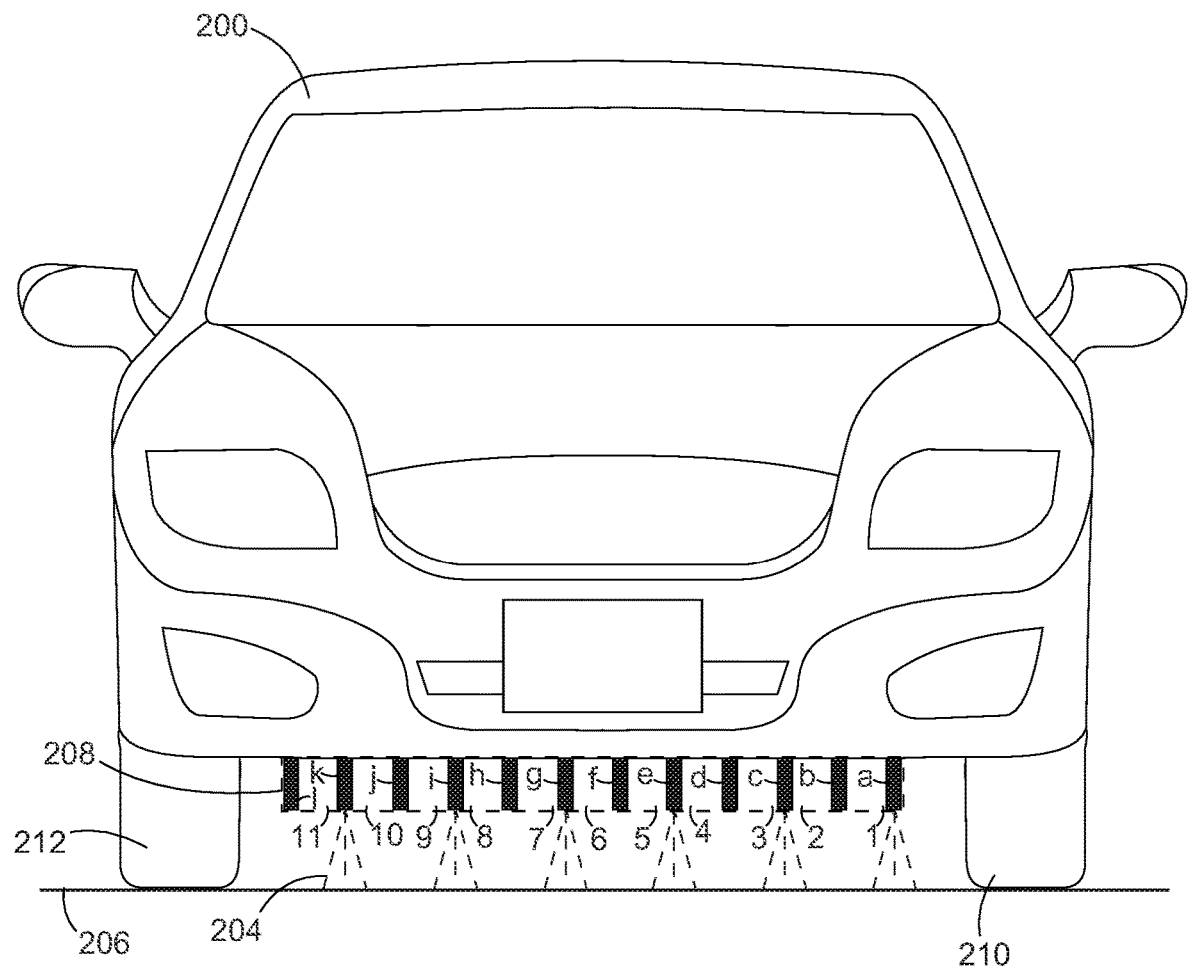
FIG. 3 shows a front view of a vehicle equipped with a GPR system in accordance with the present disclosure
Figure 4:
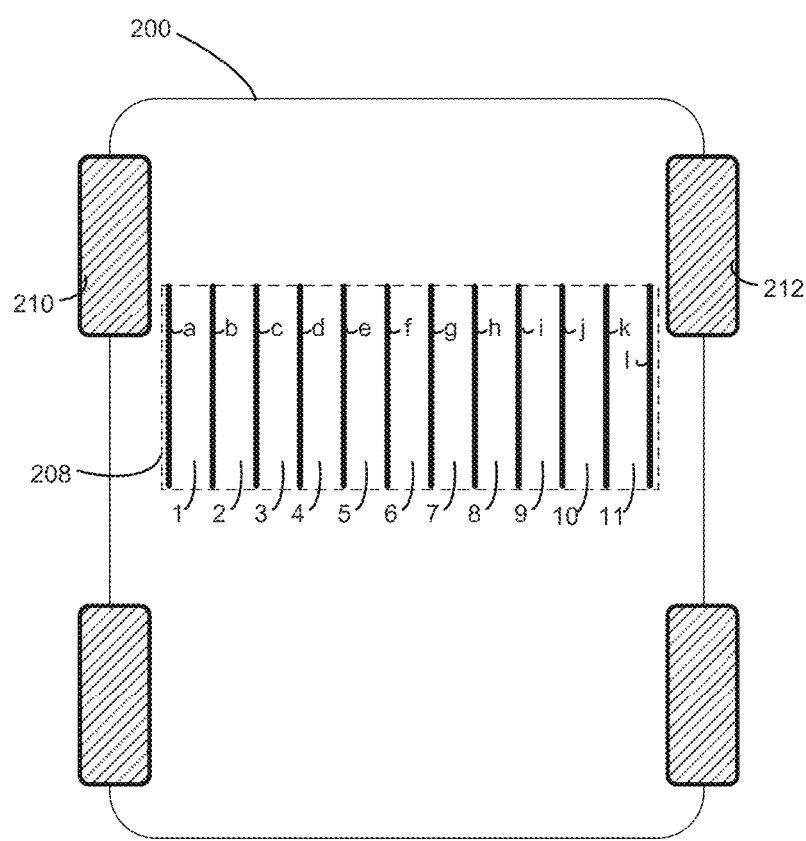
FIG. 4 shows a bottom view of a vehicle equipped with a GPR system in accordance with the present disclosure.

Referring to FIG. 3 and FIG. 4, front and bottom views of vehicle 200 are shown. SPR system 202 may include SPR antenna array 208. SPR antenna array 208 may include antenna elements a-1. While SPR antenna array 208 may include twelve antenna elements a through 1, this configuration is shown for illustrative purposes only and SPR antenna array 208 may include other numbers of antenna elements or other configurations. Antenna elements a through 1 may form eleven channels (e.g., channels 1-11). Each channel may include a transmit and a receive element or a transmit and a receive pair. For example, there may be twelve elements across SPR antenna array 208 positioned across the vehicle from the driver's side to passenger side.

In an implementation, channel 1 may be aligned with or near front tire 210 on the driver's side of vehicle 200. Channel 11 may be aligned with or near the front tire 212 on the passenger's side of vehicle 200. A set of antennas (e.g., antennas a and b) may be about 2 feet long. Each antenna may be oriented between the front and back tires of vehicle 200. One antenna (e.g., antenna a) of the channel may transmit and one antenna (e.g., antenna b) may receive. The antennas may be bar-shaped and may be spaced apart by five inches from each other. For example, antenna a may be next to front driver's side tire 210 and antenna b may be five inches closer to front passenger's side tire 212. Additional antennas c-1 may be positioned at five-inch spacings towards the passenger's side until the last antenna (1) is near passenger's side front tire 212. In this way, the SPR systems described herein may include a plurality of SPR antennas and channels positioned under the vehicle and each channel may include at least one transmit element and at least one receive element.

Figure 6:
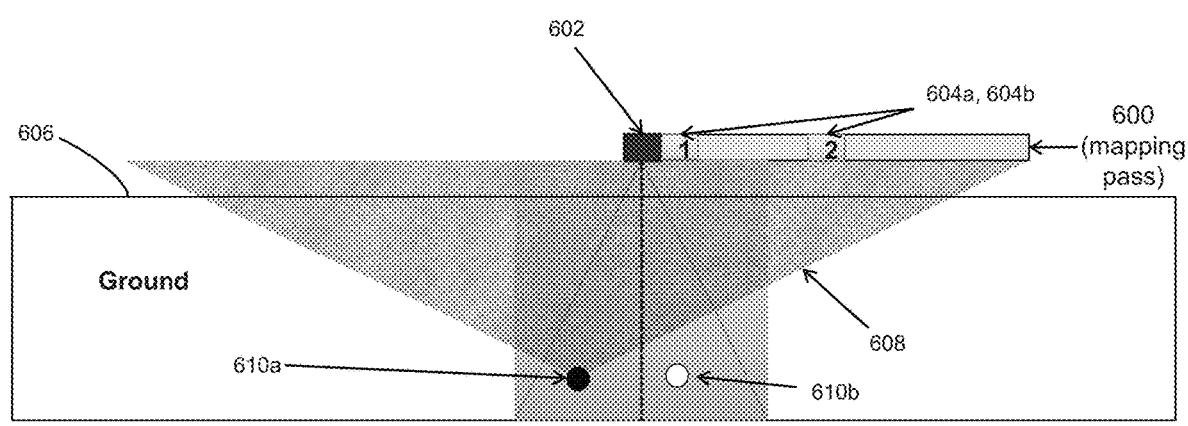
FIG. 6 shows a diagram of an example mapping pass in accordance with the present disclosure.

Referring back to FIG. 1A and also to FIG. 6, transmitting 102A at least one SPR signal from at least one SPR transmit element may include transmitting the SPR signal from transmit element 602. Transmit element 602 may be similar to one of the antenna elements a-1 shown in FIGS. 3 and 4 in connection with vehicle 200. Transmit element 602 may be part of an array 600a which may be similar to SPR antenna array 208 shown in FIGS. 3 and 4 in connection with vehicle 200. FIG. 6 shows an example mapping pass of a vehicle (not shown) in accordance with the present disclosure. Array 600 may include transmit element 602 and receive elements 604a and 604b may be used to perform a mapping pass when a vehicle drives over surface 606 and the ground under the surface.

Further, method 100 may include receiving 104B a response signal via at least two SPR receive elements (e.g., SPR receive elements 604a and 604b). The response signal may include, at least in part, a reflection (e.g., reflection 608) of the SPR signal from an object (e.g., objects 610a or 610b). In this example, object 610a is in a region of interest outside a footprint of array 600.

It should be noted that the term "object" as used herein may refer to anything under the surface being interrogated that causes a reflection or absorption of an SPR signal. For example, the term object as used herein is not limited to physical objects such as rocks but also includes change in soil types, densities, objects, water, salt content, etc. Signals may travel at different rates through different materials. When a signal crosses boundaries, changes in the signal can include inversion, dispersion, attenuation, reflection, etc. Thus, the response signal may include a reflection of the SPR signal based change in soil types, densities, objects, water, salt content, etc., and the term object as used herein is meant to be inclusive thereof.

Figure 7:
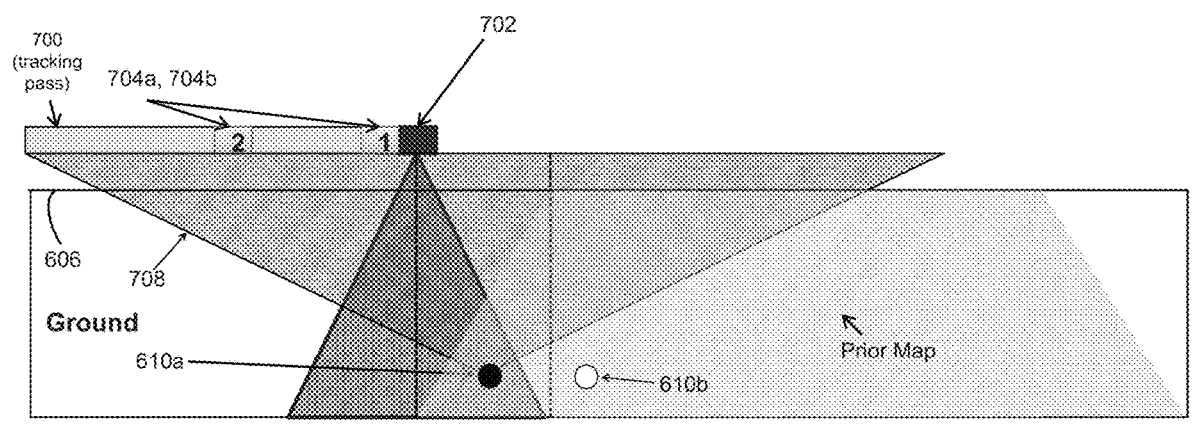
FIG. 7 shows a diagram of an example tracking pass in accordance with the present disclosure.

Referring now also to FIG. 7, transmitting 102A at least one SPR signal from at least one SPR transmit element may include transmitting the SPR signal from transmit element 702. Transmit element 702 may be similar to one of the antenna elements a-1 shown in FIGS. 3 and 4 in connection with vehicle 200. Transmit element 702 may be part of an array 700a which may be similar to SPR antenna array 208 shown in FIGS. 3 and 4 in connection with vehicle 200. FIG. 7 shows an example tracking pass of a vehicle (not shown) in accordance with the present disclosure. Array 700 may include transmit element 702 and receive elements 704a and 704b may be used to perform a tracking pass when a vehicle drives over surface 606 and the ground under the surface.

Further, method 100 may include receiving 104A a response signal via at least two SPR receive elements (e.g., SPR receive elements 704a and 704b). The response signal may include, at least in part, a reflection (e.g., reflection 708) of the SPR signal from an object (e.g., objects 610a or 610b). In this example, object 610a is in a region of outside a footprint of array 700. It should be noted that array 600 and array 700 may be the same array on the same vehicle moving in opposite directions or may be similar arrays on different vehicles but arranged in a mirrored fashion on one vehicle as compared to another.

Method 100 may also include determining 106A that the object (e.g., object 610a) is in a region of interest outside a footprint of the SPR system based on a difference in phase at which the response signal is received at the at least two SPR receive elements (e.g., SPR receive elements 604a and 604b or SPR receive elements 704a and 704b). For example, referring to FIG. 6, while object 610a is not underneath array 600, reflection 608 (corresponding to the SPR signal transmitted in 102a) from object 610 reaches receive elements 604a and 604b of array 600. Similarly, referring to FIG. 7, while object 610a is not underneath array 700, reflection 708 (corresponding to the SPR signal transmitted in 102A) reaches receive elements 704a and 704b of array 700. The response signal corresponding to the reflection (e.g., reflection 608 or 708) will reach the receive elements (e.g., SPR receive elements 604a and 604b or SPR receive elements 704a and 704b) and a difference in phase at which the response signal is received at the receive elements can be determined. Phase measurements corresponding to the phase of the response signal when it reaches the receive elements (e.g., SPR receive elements 604a and 604b or SPR receive elements 704a and 704b) may be used to identify the object and its approximate location. A difference in phase may effectively be a difference in the time that the signal takes to get to the receiver from the transmitter. Measuring the difference in timing may be performed at a given position.

Collectively, the mapping and tracking passes described above can be seen in FIG. 8. As shown, while object 610a is not underneath array 600, reflection 608 (corresponding to the SPR signal transmitted in 102*a*) from object 610 reaches receive elements 604*a* and 604*b* of array 600. Similarly, referring to FIG. 7, while object 610*a* is not underneath array 700, reflection 708 (corresponding to the SPR signal transmitted in 102A) reaches receive elements 704*a* and 704*b* of array 700. The response signal corresponding to the reflection (e.g., reflection 608, 708) will reach the receive elements (e.g., SPR receive elements 604*a* and 604*b* or SPR receive elements 704*a* and 704*b*) and a difference in phase at which the response signal is received at the receive elements can be determined.

Method 100A may also include performing 108A localization of a vehicle using the SPR system based at least in part on the object. For example, during the mapping pass, array 600 may acquire data sufficient to identify object 610*a*. Subsequently, on the tracking pass, array 700 may acquire data sufficient to identify object 610*a*, and using the techniques and features described herein and in one or more of U.S. patent application Ser. No. 15/830,398 and U.S. Pat. No. 8,949,024 (referred to above), localization of the vehicle maybe performed.

Figure 8:
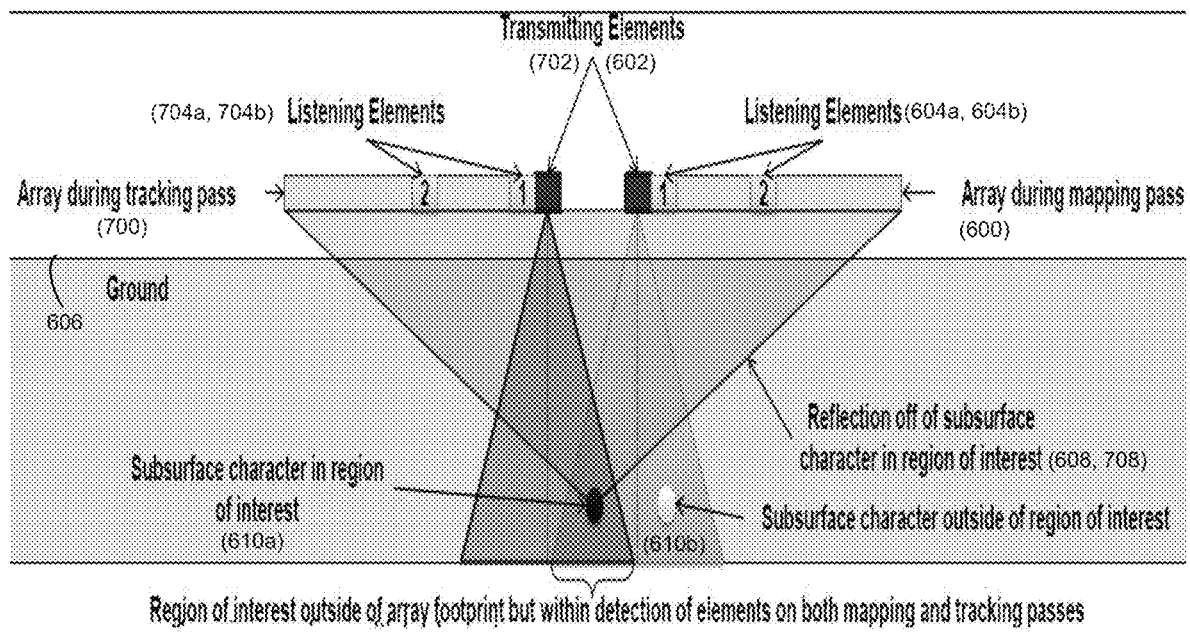
FIG. 8 shows a diagram of an example mapping pass and an example tracking pass in accordance with the present disclosure.

In this way, method 100A may include expanding 110A a map associated with performing localization with the SPR system based at least in part on the object (e.g., object 610*a*). Referring to FIG. 8, this is true despite the mapping pass described above having never actually passed over the region of interest having object 610*a* outside of the array (e.g., array 600) footprint because object 610*a* is within detection of receiving (or listening) elements on both the mapping pass (e.g., elements 604*a* and 604*b*) and the tracking pass (e.g., elements 704*a* and 704*b*). Similarly, method 100A may include performing 112A localization of the vehicle when a tracking pass only partially overlaps with a map footprint associated with performing localization with the SPR system.

Thus, using the techniques and features described in the present disclosure, method 100A may include expanding 114A a map associated with performing localization with the SPR system beyond an area below the SPR antenna array (e.g., array 600). Because the map may include the area beyond what is below the SPR antenna array (e.g., array 600), method 100A may include performing 116A less mapping passes of the area by expanding the map associated with performing localization with the SPR system. Further, because the map may include the area beyond what is below the SPR antenna array (e.g., array 600), method 100A may include expanding 118A the area where localization can be performed by expanding the map associated with performing localization with the SPR system.

As discussed above, the response signal corresponding to the reflection (e.g., reflection 608 or 708) will reach the receive elements (e.g., SPR receive elements 604*a* and 604*b* or SPR receive elements 704*a* and 704*b*) and a difference in phase at which the response signal is received at the receive elements can be determined. These phase difference may be used to determine 120A a distance from the object (e.g., object 610*a*) to an SPR element of the SPR system. The distance may also be determined based on the receiving of the response signal via the at least two SPR receive elements by using other information or factors.

Using two or more SPR listening or receiving elements (e.g., SPR receive elements 604*a* and 604*b* or SPR receive elements 704*a* and 704*b*) to receive a response signal based from a transmission from one SPR transmit element and make various determinations therefrom may be referred to as use of a multiple input multiple output (MIMO) array. The MIMO technique may use bi-static migration techniques to localize the source of reflections, including just outside the footprint of the corresponding array (e.g., array 600 or 700). The measurement of a phase difference at which the response signal is received at two different receivers (e.g., SPR receive elements 604*a* and 604*b* or SPR receive elements 704*a* and 704*b*) may allow for determining which reflections are in the region of interest outside of the footprint of the array (e.g., reflections from object 610*a*). For example, the distance to element 1 (e.g., element 604*a* or 704*a*) and element 2 (e.g., element 604*b* or 704*b*) may be determined based on the phase difference and the distance on each pass may be different if the subsurface character was outside of the region of interest (object 610*b*). This may allow mapping and localization techniques to the correct part of the SPR subsurface map, which may be located outside of the footprint of the array. This technique may be used to expand the useful map of the SPR system for localization since the region of interest allows localization when the footprint of the tracking pass does not overlap the map footprint. In this way, method 100A may include migrating 122A data associated with the receiving of the response signal via the at least two SPR receive elements (e.g., SPR receive elements 604*a* and 604*b* or SPR receive elements 704*a* and 704*b*.

Some methods for migration along the path taken may include hyperbolic summation, hyperbolic summation, Kirchhoff migration, phase-shift migration, Stolt migration, and back-projection focusing. MIMO GPR systems may have variants on these techniques such as a modified Kirchhoff migration.

Figure 9:
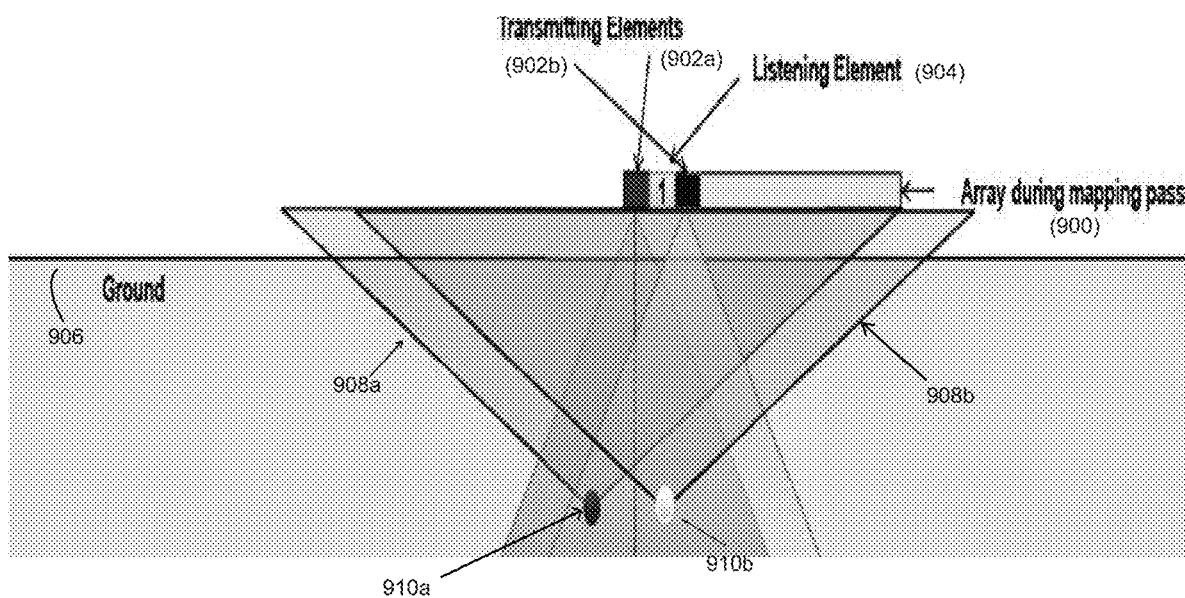
FIG. 9 shows a diagram of an example mapping pass in accordance with the present disclosure.

Referring now to FIG. 1B, a method 100B for extending a surface penetrating radar (SPR) footprint for performing localization with an SPR system. Method 100B may describe operations somewhat similar to method 100A, however method 100B may be a single input multiple output (SIMO) configuration. Referring now also to FIG. 9 a mapping pass of an array 900 of an SPR system in accordance with the present disclosure is shown. Method 100B may include transmitting 102B two or more SPR signals each from a different SPR transmit element (e.g., transmit elements 902A, 902B). Method 100B may also include receiving 104B two or more response signals via a SPR receive element (e.g., listen or receive element 904). The response signals may include, at least in part, reflections of the two or more SPR signals from an object (e.g., object 910*a*). The array 900, transmit elements 902*a* and 902*b*, and receive element 904 may be the same as or similar to array 208 or antenna elements a-1, respectively, of FIG. 3 and FIG. 4.

Figure 10:
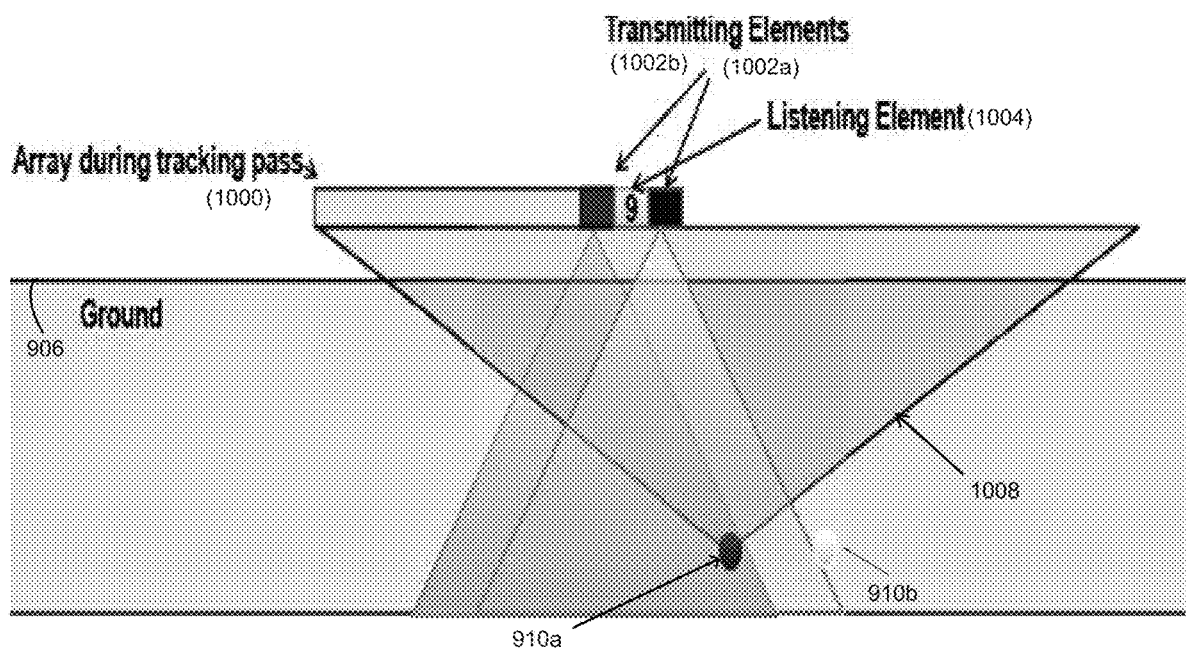
FIG. 10 shows a diagram of an example tracking pass in accordance with the present disclosure.

Referring now also to FIG. 10 a tracking pass of an array 1000 of an SPR system in accordance with the present disclosure is shown. Method 100B may include transmitting 102B two or more SPR signals each from a different SPR transmit element (e.g., transmit elements 1002A, 1002B). Method 100B may also include receiving 104B two or more response signals via a SPR receive element (e.g., listen or receive element 1004). The response signals may include, at least in part, reflections of the two or more SPR signals from an object (e.g., object 910*a*). The array 1000, transmit elements 1002*a* and 1002*b*, and receive element 1004 may be the same as or similar to array 208 or antenna elements a-1, respectively, of FIG. 3 and FIG. 4.

Method 100B may include determining 106B that the object (e.g., object 910*a*) is in a region of interest outside a footprint of the SPR system based on a difference in phase at which the response signal is received at the at least two SPR receive elements (e.g., listen or receive elements 904 or 1004). Using one SPR listening or receiving element (e.g., listen or receive element 904 or 1004) to receive a response signal based from transmissions from multiple SPR transmit elements (e.g., transmit elements 902*a* and 902*b* or transmit elements 1002*a* and 1002*b*) and making various determinations therefrom may be referred to as use of a single input multiple output (SIMO). The SIMO technique may use bi-static migration techniques to localize the source of reflections, including just outside the footprint of the corresponding array (e.g., array 900 or 1000). The determining the phase difference at which the response signal is received at the SPR receive elements (e.g., SPR receive elements 904 or 1004) may allow for determining which reflections are in the region of interest outside of the footprint of the array (e.g., reflections from object 610*a*). For example, the distance to element 1 (e.g., element 904) and element 9 (e.g., element 1004) on each pass may be different if the subsurface character was outside of the region of interest (object 910*b*). This may allow mapping and localization techniques to the correct part of the SPR subsurface map, which may be located outside of the footprint of the array (e.g., array 900 or 1000). This technique may be used to expand the useful map of the SPR system for localization since the region of interest allows localization when the footprint of the tracking pass does not overlap the sensor footprint (e.g., directly underneath the sensor. In this way, method 100B may include migrating 122B data associated with the receiving of the response signals via the SPR receive (e.g., SPR receive elements 904 or 1004).

Method 100B may also include performing 108B localization of a vehicle using the SPR system based at least in part on the object (e.g., object 910*a*). For example, during the mapping pass, array 900 may acquire data sufficient to identify object 610*a*. Subsequently, on the tracking pass, array 1000 may acquire data sufficient to identify object 610*a*, and using the techniques and features described herein and in one or more of U.S. patent application Ser. No. 15/830,398 and U.S. Pat. No. 8,949,024 (referred to above), localization of the vehicle maybe performed.

In this way, method 100B may include expanding 110B a map associated with performing localization with the SPR system based at least in part on the object (e.g., object 910*a*). Referring to FIG. 9 and FIG. 10 this is true despite the mapping pass of FIG. 9 having never actually passed over the region of interest having object 910*a* outside of the array (e.g., array 900) footprint because object 910*a* is within detection of the receiving (or listening) element on both the mapping pass (e.g., element 904) and the tracking pass (e.g., element 1004). Similarly, method 100B may include performing 112B localization of the vehicle when a tracking pass only partially overlaps with a map footprint associated with performing localization with the SPR system.

Thus, using the techniques and features described in the present disclosure, method 100B may include expanding 114B a map associated with performing localization with the SPR system beyond an area below the SPR antenna array (e.g., array 900 or 1000). Because the map may include the area beyond what is below the SPR antenna array (e.g., array 900 or 1000), method 100B may include performing 116B less mapping passes of the area by expanding the map associated with performing localization with the SPR system. Further, because the map may include the area beyond what is below the SPR antenna array (e.g., array 900 or 1000), method 100B may include expanding 118B the area where localization can be performed by expanding the map associated with performing localization with the SPR system.

As discussed above, the response signals corresponding to the reflection (e.g., reflection 908*a* or 1008) will reach the receive element (e.g., SPR receive element 904 or 1004) and a difference in phase at which the response signal is received at the receive elements may be determined. These phase difference may be used to determine 120B a distance from the object (e.g., object 910*a*) to an SPR element (e.g., SPR receive element 904 or 1004) of the SPR system. The distance may also be determined based on the receiving of the response signals via the SPR receive element (e.g., SPR receive element 904 or 1004) by using other information or factors.

It should be noted that while method 100A (e.g., MIMO technique) and method 100B (e.g., SIMO) technique have been described separately herein, both techniques maybe used together to further enhance recognition of objects outside of SPR array footprints. For example, referring to FIG. 1C, a method 100C is shown. Method 100C may combine the MIMO and SIMO techniques described above.

Method 100C may include may include transmitting 102C a first SPR signal from a first SPR transmit element and a second SPR signal from a second SPR transmit element. Method 100C may further include receiving 104C a first response signal at a first SPR receive element and at a second SPR receive element. The first response signal may include, at least in part, a reflection of the first SPR signal from an object. Method 100C may also include receiving 106C a second response signal via at least one of the first SPR receive element and the second SPR receive element, the second response signal including, at least in part, a reflection of the second SPR signal from the object. Method 100C may additionally include determining 108C that the object is in a region of interest outside a footprint of the SPR system based on a difference in phase at which the first response signal is received at the first SPR receive element and the second SPR receive element and a difference in phase at which the first response signal and the second response signal are received via the at least one of the first SPR receive element and the second SPR receive element. Method 100C may also include performing 110C localization of a vehicle using the SPR system based at least in part on the object.

It should be noted that one or more of the operations described in methods 100A, 100B, and 100C, including but not limited to the operations of determining/identifying an object is outside a footprint, performing localization, and migrating data may be performed via one or more processors that may be included in, in communication with, or otherwise part of the SPR systems described herein. For example, the one or more processors may be similar to SPR processor 504 of FIG. 5, and SPR system 500 may include more than one processor configured to carry out the operations of one or more of in methods 100A, 100B, and 100C.

One or more of the techniques and features described herein may be shown to be achievable through, in part, the use of an electromagnetic modeling of an SPR array. One or more method of moments simulations of an SPR cavity-backed dipole array over an infinite half space may be used. Soil may be assumed to have a dielectric constant of 6.0 and an electrical conductivity equal to 0.01 S/m. At 250 MHz, a corresponding attenuation constant may be computed to be 0.77 nepers/m which may result in a plane-wave attenuation of 6.7 dB per meter. The modeling may assumes a 1 W transmit power at a central radiating dipole element and feed terminals of surrounding elements terminated in 50-ohm resistive loads. An electric-field strength may be computed in soil and co-polarized with dipole elements.

Figure 11:
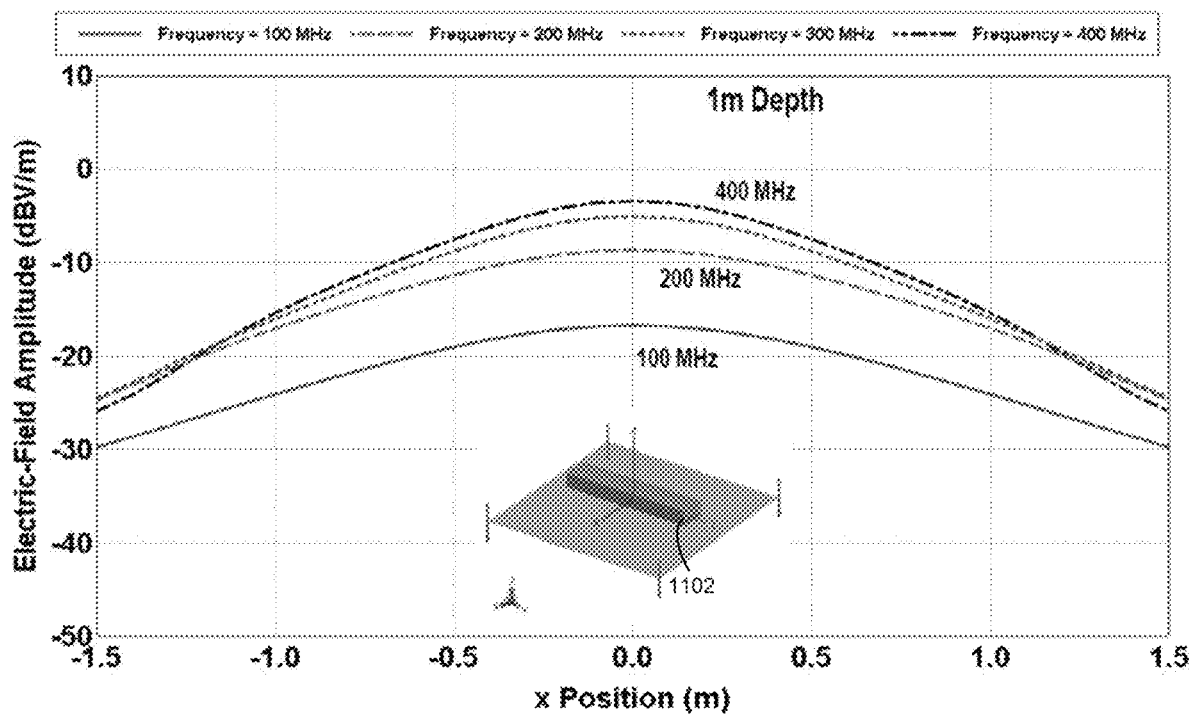
FIG. 11 shows a plot of a simulated electric-field (E-Plane) of a dipole element.

Referring now to FIG. 11, simulated electric-field (E-Plane) of a central radiating dipole element in an array 1102 (orientation shown) is shown in plot 1100. The small image around the array 1102 shows the ground in the simulation and provides the x, y, z coordinate frame. Antennas such as those described herein are part of array 1102, which may be places, for example, under the bottom carriage of a vehicle.

Plot 1100 shows that for different frequencies being emitted (looking at the output of the model described above), from a central antenna inside of the array, the electric field potential is shown given a particular depth and a particular position away from that element. The potential is shown for 1 m depth in the x position (e.g., for radiation going along the x axis) at plus or minus 1.5 m. At 1 m depth, there is shown a range of electric-field amplitudes, measured in dBV/m, for signals sent out at the various frequencies shown at the top of the plot 1100.

Figure 12:
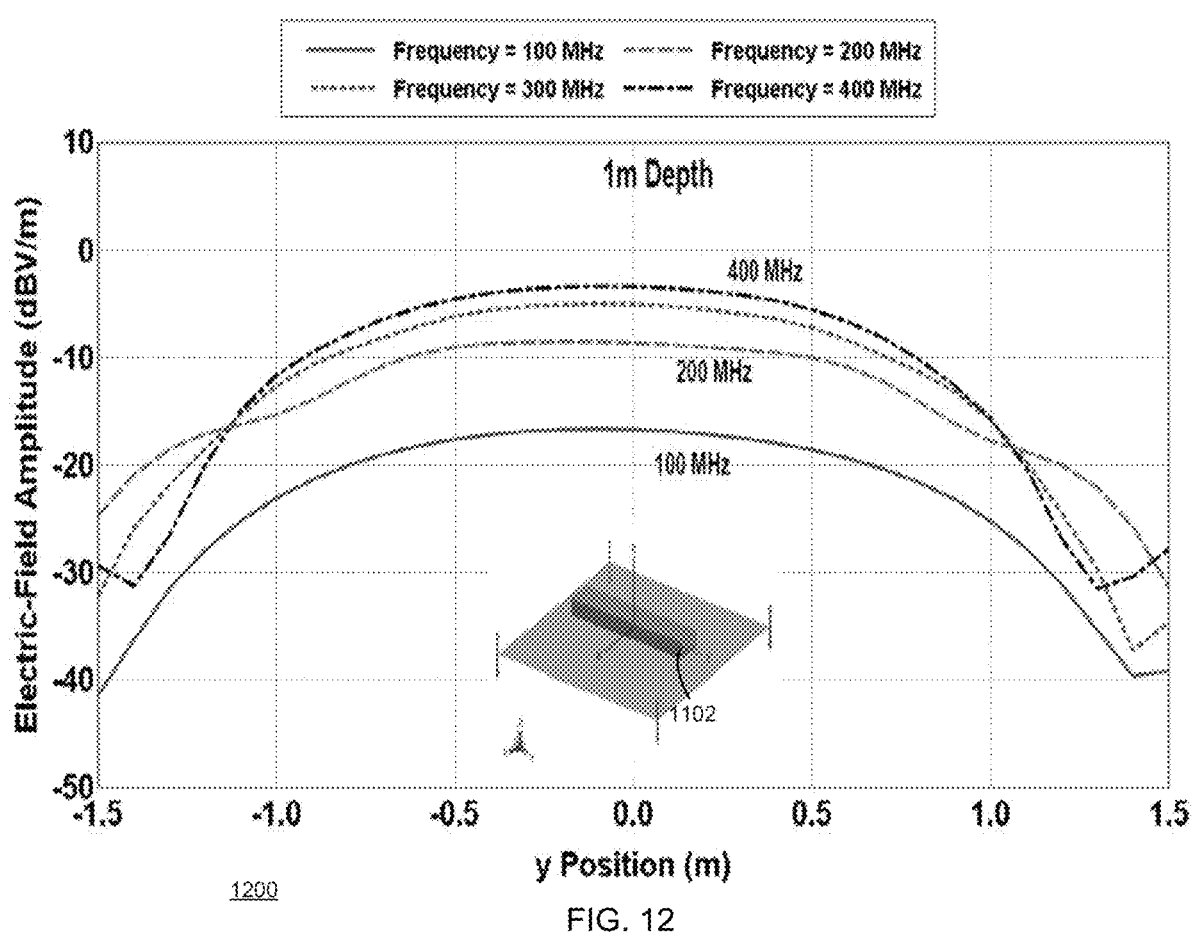
FIG. 12 shows a plot of a simulated electric-field (H-Plane) of a dipole element.

Referring now to FIG. 12, a simulated electric-Field (H-Plane) in the y axis or y position is shown in plot 1200. Plot 1200 shows a range of electric-field amplitudes orthogonal to the array 1102. It can be seen that in the extended range in the H plane or along the Y axis, there is energy available to provide the reflections described above.

Figure 13:
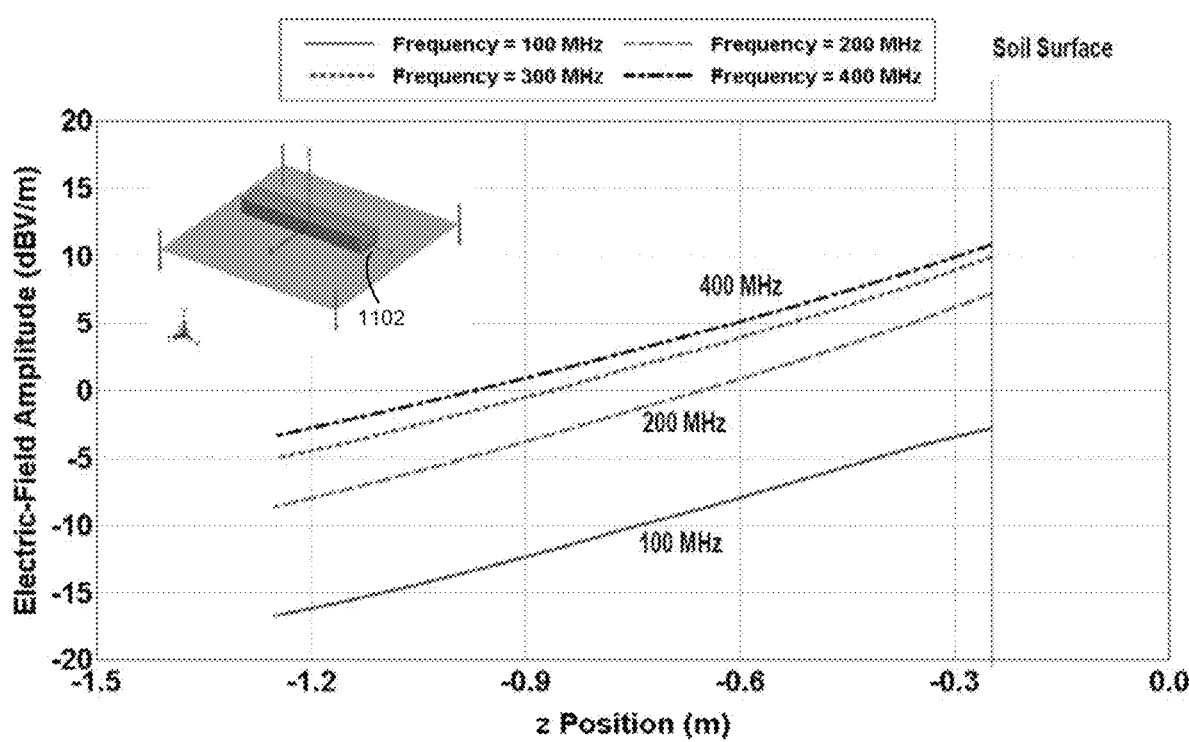
FIG. 13 shows a plot of a simulated electric-field versus depth.

Referring now to FIG. 13, a simulated electric-field versus depth in soil is shown in plot 1300. Plot 1300 shows a range of electric-field amplitudes at the z position (i.e., moving down in depth, where the soil is to the right the vertical red line). In other words, the depth underneath the array and the amplitude is as a function of depth is shown. For example, at 400 MHz and roughly −1.2 meters below the surface, the electric-field amplitude is approximately −3.0 dBV/m.

Figure 14:
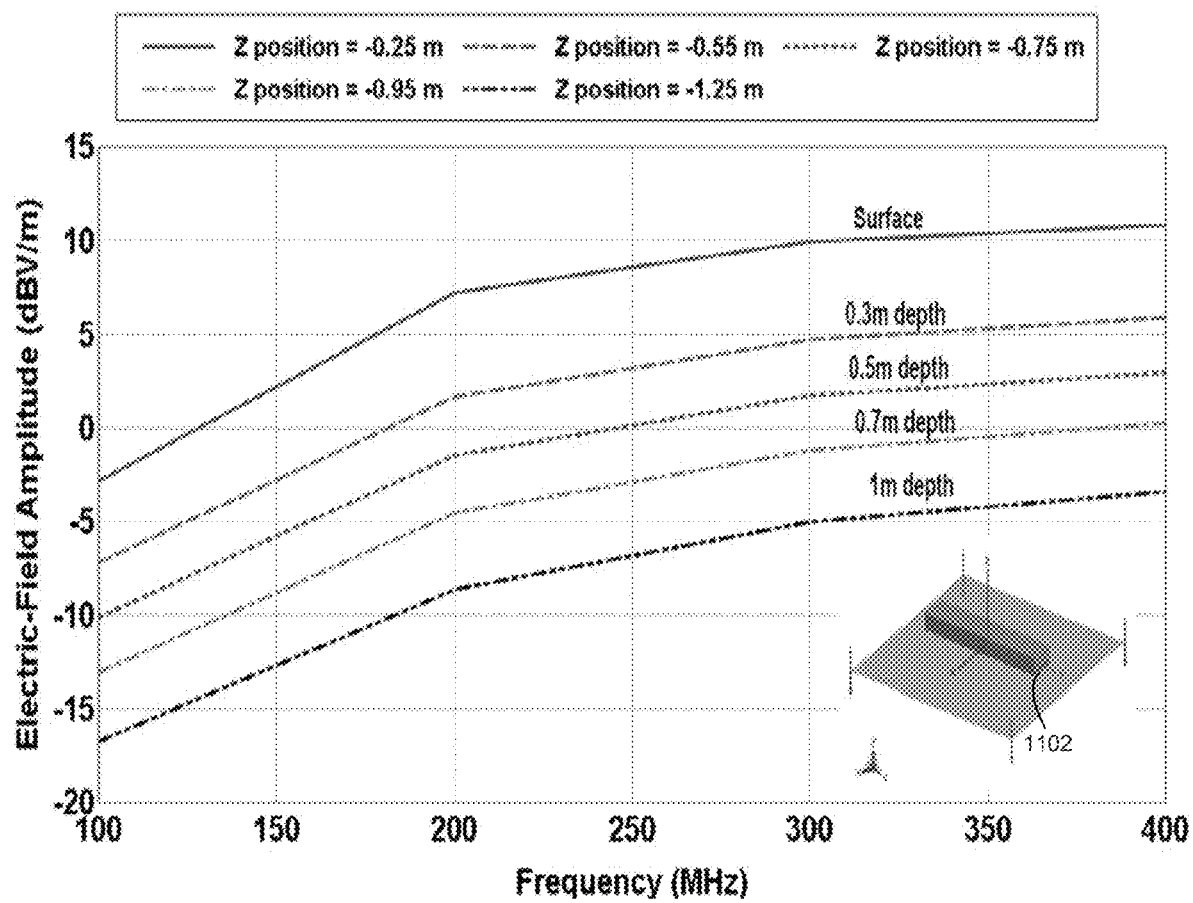
FIG. 14 shows a plot of a simulated electric-field versus frequency.

Referring now to FIG. 14, a simulated electric-field versus frequency is shown in plot 1400. Plot 1400 shows what the electric-field amplitudes are based on frequencies. Plot 1400 shows what the field strength is what amount of energy would hit an object in the ground.

Plots 1100-1400 may be used to view results of the model to determine the energy and the field strength at various depths or positions. In a sense, it can be what the array footprint looks like and how much energy extends beyond the footprint of the array. The footprint may increase as depth increases but the amount of energy decreases with depth. For example, in the x position (plot 1100), the −1.5 m to +1.5 m axis may represent an extension of the array footprint in the x direction.

In an implementation, one or more of the techniques and features described in the present disclosure may facilitate controlling a vehicle (e.g., vehicle 200). Controlling the vehicle may include controlling the velocity, acceleration, orientation, angular velocity and/or angular acceleration of the vehicle and the vehicle may be continuously controlled via one or more vehicle navigation commands to maintain the vehicle at a desired position along a trip path or to maintain safety of the vehicle or any passengers in the vehicle, based in part on for example, localization of the vehicle. In an implementation, commands generated by an autonomous vehicle navigation system may use the localization and/or related data described herein to affect a vehicle path change to reduce or minimize the differences between the vehicle track and a trip path. For example, the speed of the vehicle may be modified along segments of the trip path to maintain safe operation, to accommodate speed limits, and to achieve a desired completion time for traversing the trip path.

In an implementation, steering, orientation, velocity, pose and acceleration/deceleration may controlled in a manner to maintain safety of the vehicle or its passengers based on the surface characteristic or condition data described here. For example, the vehicle control system may include or cooperate with electrical, mechanical and pneumatic devices in the vehicle to achieve steering and speed control. In other embodiments having various types of propulsion and control mechanisms, a vehicle control system may also include or cooperate with one or more hydraulic, turbine, propeller, control surface, shape changing, and chemical systems or devices.

Various embodiments described above relate to navigation over road networks and therefore in what generally can be referred to as an outdoor surface environment. Alternatively, a vehicle may be controlled in an indoor environment such as inside a building or within a complex of buildings. The vehicle can navigate hallways, warehouses, manufacturing areas and the like. In other alternatives, a vehicle may be controlled inside structures in regions that may be hazardous to humans, such as in nuclear power facilities and in hospital and research facilities where biohazards may be present. In various embodiments, a SPR is used to obtain SPR images that include subsurface regions in and/or behind floors, ceilings or walls. Thus, the mobile SPR system can be oriented to transmit radar signals and receive radar signals in a preferred direction.

Another alternative environment is an underground environment which may include, by way of examples, an underground tunnel or mine passageway. Thus, a mining vehicle can be configured with an SPR antenna array configured to transmit and receive in any direction orthogonal to the vehicle direction of travel for which previously acquired SPR reference images are available. Optionally, the mining vehicle can inspect the tunnel or passageway structure for changes or content by determining differences in the SPR images acquired by the vehicle after registration to the corresponding SPR reference images.

While the invention has been shown and described with reference to specific embodiments, it should be understood by those skilled in the art that various changes in form and detail may be made therein without departing from the scope of the invention.

What is claimed is:

1. A method for extending a surface penetrating radar (SPR) footprint for performing localization with an SPR system, the method comprising:
   transmitting at least one SPR signal from at least one SPR transmit element;
   receiving a response signal via at least two SPR receive elements, the response signal including, at least in part, a reflection of the SPR signal from an object;
   determining that the object is in a region of interest outside a footprint of the SPR system based on a difference in phase at which the response signal is received at the at least two SPR receive elements; and
   performing localization of a vehicle using the SPR system based at least in part on the object.

2. The method of claim 1, further comprising:
   expanding a map associated with performing localization with the SPR system based at least in part on the object.

3. The method of claim 1, further comprising:
performing localization of the vehicle when a tracking pass only partially overlaps with a map footprint associated with performing localization with the SPR system.

4. The method of claim 1, wherein the object is not below an SPR antenna array of the SPR system.

5. The method of claim 4, further comprising:
expanding a map associated with performing localization with the SPR system beyond an area below the SPR antenna array.

6. The method of claim 5, further comprising:
performing less mapping passes of an area by expanding the map associated with performing localization with the SPR system.

7. The method of claim 5, further comprising:
expanding an area where localization can be performed by expanding the map associated with performing localization with the SPR system.

8. The method of claim 1, further comprising:
determining a distance from the object to an SPR element of the SPR system based on the receiving of the response signal via the at least two SPR receive elements.

9. The method of claim 1, further comprising:
migrating data associated with the receiving of the response signal via the at least two SPR receive elements.

10. The method of claim 1, further comprising:
performing localization of the vehicle when a tracking pass only partially overlaps with a map footprint associated with performing localization with the SPR system.

11. The method of claim 1, wherein the object is not below an SPR antenna array of the SPR system.

12. The method of claim 11, further comprising:
expanding a map associated with performing localization with the SPR system beyond an area below the corresponding SPR antenna array.

13. The method of claim 12, further comprising:
performing less mapping passes of an area by expanding the map associated with performing localization with the SPR system.

14. The method of claim 12, further comprising:
expanding an area where localization can be performed by expanding the map associated with performing localization with the SPR system.

15. The method of claim 1, further comprising:
determining a distance from the object to an SPR element of the SPR system based on the receiving of the two or more response signals via the SPR receive element.

16. The method of claim 1, further comprising:
migrating data associated with the receiving of the response signal via the SPR receive element.

17. A method for extending a surface penetrating radar (SPR) footprint for performing localization with an SPR system, the method comprising:
transmitting two or more SPR signals each from a different SPR transmit element;
receiving two or more response signals via a SPR receive element, the response signals including, at least in part, reflections of the two or more SPR signals from an object;
determining that the object is in a region of interest outside a footprint of the SPR system based on a difference in phase at which the two or more response signals are received at the SPR receive element; and
performing localization of a vehicle using the SPR system based at least in part on the object.

18. The method of claim 17, further comprising:
expanding a map associated with performing localization with the SPR system based at least in part on the object.

19. A method for extending a surface penetrating radar (SPR) footprint for performing localization with an SPR system, the method comprising:
transmitting a first SPR signal from a first SPR transmit element and a second SPR signal from a second SPR transmit element;
receiving a first response signal at a first SPR receive element and at a second SPR receive element, the first response signal including, at least in part, a reflection of the first SPR signal from an object;
receiving a second response signal via at least one of the first SPR receive element and the second SPR receive element, the second response signal including, at least in part, a reflection of the second SPR signal from the object;
determining that the object is in a region of interest outside a footprint of the SPR system based on a difference in phase at which the first response signal is received at the first SPR receive element and the second SPR receive element and a difference in phase at which the first response signal and the second response signal are received via the at least one of the first SPR receive element and the second SPR receive element; and
performing localization of a vehicle using the SPR system based at least in part on the object.

20. A system for extending a surface penetrating radar (SPR) footprint for performing localization with SPR, the system comprising:
a first SPR transmit element configured to transmit a first SPR signal;
a second SPR transmit element configured to transmit a second SPR signal;
a first SPR receive element configured to receive a first response signal, the first response signal including, at least in part, a reflection of the first SPR signal from an object;
a second SPR receive element configured to receive the first response signal, wherein at least one of the first and second SPR receive elements are configured to receive a second response signal, the second response signal including, at least in part, a reflection of the second SPR signal from the object; and
one or more processors in communication with the first and second SPR receive elements, the one or more processors configured to:
determine that the object is in a region of interest outside a footprint associated with the system based on a difference in phase at which the first response signal is received at the first SPR receive element and the second SPR receive element and a difference in phase at which the first response signal and the second response signal are received via the at least one of the first SPR receive element and the second SPR receive element; and
perform localization of a vehicle based at least in part on the object.

* * * * *

UNITED STATES PATENT AND TRADEMARK OFFICE
CERTIFICATE OF CORRECTION

PATENT NO. : 10,663,579 B2
APPLICATION NO. : 15/882986
DATED : May 26, 2020
INVENTOR(S) : Byron McCall Stanley and Matthew Tyler Cornick It is certified that error appears in the above-identified patent and that said Letters Patent is hereby corrected as shown below:

In the Abstract, Line 3:
• Delete the second occurrence of the phrase "may include"

Signed and Sealed this
Ninth Day of March, 2021

Drew Hirshfeld
*Performing the Functions and Duties of the
Under Secretary of Commerce for Intellectual Property and
Director of the United States Patent and Trademark Office*